United States Patent [19]

von Bonin et al.

[11] Patent Number: 4,600,734

[45] Date of Patent: Jul. 15, 1986

[54] RUBBER MIXTURES AND MOULDINGS PRODUCED THEREFROM BY VULCANIZATION

[75] Inventors: Wulf von Bonin, Leverkusen; Gerd Matenar, Grafing, both of Fed. Rep. of Germany

[73] Assignee: Bayer Aktiengesellschaft, Leverkusen, Fed. Rep. of Germany

[21] Appl. No.: 691,200

[22] Filed: Jan. 14, 1985

[30] Foreign Application Priority Data

Jan. 24, 1984 [DE] Fed. Rep. of Germany ....... 3402309

[51] Int. Cl.⁴ ................. C08L 21/00; C08K 5/52; C08K 3/10; H01B 3/28
[52] U.S. Cl. ..................... 523/179; 524/101; 524/437; 524/563; 524/505; 524/578
[58] Field of Search ............... 524/437, 505, 563, 578, 524/101; 523/179

[56] References Cited

U.S. PATENT DOCUMENTS

| 3,914,193 | 10/1975 | Fessler et al. ........... 523/179 |
| 3,969,291 | 7/1976 | Fukuba et al. ........... 523/179 |
| 4,174,420 | 11/1979 | Anolick et al. ........... 521/90 |
| 4,341,694 | 7/1982 | Halpern ........... 523/179 |
| 4,404,297 | 9/1983 | Fishler et al. ........... 524/140 |
| 4,420,577 | 12/1983 | Bertelli et al. ........... 523/179 |

FOREIGN PATENT DOCUMENTS

| 1408133 | 10/1975 | United Kingdom ........... 523/179 |
| 1445832 | 8/1976 | United Kingdom ........... 523/179 |

*Primary Examiner*—Herbert J. Lilling
*Attorney, Agent, or Firm*—Connolly and Hutz

[57] ABSTRACT

Rubber mixtures containing salts of cyanuric acid or cyanuric acid derivatives are suitable for preventive fire protection.

3 Claims, No Drawings

RUBBER MIXTURES AND MOULDINGS PRODUCED THEREFROM BY VULCANIZATION

This invention relates to rubber mixtures which contain as mixing constituents salts of cyanuric acid or cyanuric acid derivatives and mouldings produced therefrom by vulcanisation, which are used for the purposes of preventive fire protection.

Constructional elements of vulcanised rubber mixtures containing aluminium-hydroxide, antimony trioxide or chloroparaffins are used for preventive fire protection, for example for flame-proofed cable sheaths or elements for cable ducts for cables.

If mouldings are to be produced which are very insensitive with regard to inflammability and give $O_2$-indices (LOI) of more than 50 in the "oxygen-index test in accordance with ASTM D 2863", then rubbers have to be used which contain hetero-atoms, such as N, halogen or Si, for example silicone rubbers, nitrile rubbers, fluorine rubbers, chlorosulphonated or post-chlorinated olefin polymers or more particularly polychloroprene rubbers. Flame-proof-equipped rubber mixtures or vulcanisates have proved very successful on account of the good mechanical properties which can be obtained with them.

Good mechanical properties can only be achieved in the rubber mouldings if limited quantities of particular types of fillers which bring about fire-resistance or difficult flammability (such as aluminium hydroxides) are used.

It has been shown that even if large quantities of aluminium hydroxides are used in halogen-containing rubber mixtures, the smoke gases produced in the fire react acidically and the aluminium hydroxides clearly do not contribute greatly to neutralizing the pyrolytically-produced HC. Consequently, fillers are sought which are active with regard to difficult flammability and ensure the maintenance of good mechanical properties, and which fillers prevent the production of acidic combustion gases when the vulcanisates burn.

There is a particular need for flame-retarding fillers which make the rubber mixture flame-resistant and provide it with properties of intumescence, that is increase its volume.

Furthermore, these fillers should not disturb the vulcanisation process and the further processing and should be capable of withstanding the vulcanisation and processing temperatures which are generally above 120° C. without loss of function.

It has now been found that salts, particularly phosphates of cyanuric acid and cyanuric acid derivatives, more particularly melamine, may serve as such fillers. This finding is surprising in that the melamine has only a very poor basic character, the phosphates thereof can often have a poor acidic reaction but are nevertheless capable of reducing the production of acidic combustion gases. It was not thought that such salt-like material would be suitable as a good filler which would scarcely disturb the mechanical properties of the vulcanisates.

It has also been found that the additive- or filler-containing rubber vulcanisates according to the invention have properties of intumescence in fire, that is experience an expansion increase in volume, although the combustion of the phosphate itself is not an indication of the formation of intumescence foam.

Thus an object of the present invention is to provide rubber mixtures, characterised in that they contain salts of cyanuric acid or cyanuric acid derivatives.

A further object of the present invention is to provide mouldings produced from these rubber masses by vulcanisation.

The present invention relates more particularly to mouldings of vulcanised ethylene copolymer and preferably polychloroprene rubber mixtures which contain melamine phosphate.

Examples of mouldings produced from the vulcanised rubber mixtures are films, tubes, plates profiles, seals, blocks, wires, bonds, fibres, plugs in foamed or massive form, covering layers and coatings.

The salts can be salts of organic or inorganic acids.

Examples thereof are oxalates, formates, citrates, salts of trimellitic acid, sulphanilic acid, chloroacetic acid or salts of hydrohalic acids, nitrates, sulphates, vanadates, molybdates, silicates, borates, more particularly salts of acids of phosphorus, particularly of $H_3PO_4$, $H_3P_2O_7$ or polyphosphoric acid.

The salts may be addition products of from 0.01 to more than 3; more particularly from 0.2 to 1.5 mols of acid per cyanuric acid derivative.

The salts of the cyanuric acid derivatives are contained in the rubber mixtures in a quantity of from 0.5 to 55% by weight, preferably from 5 to 30% by weight, based on the total weight. They can completely or partially replace conventional fireproofing fillers or fillers which are neutral in terms of their behaviour in fire.

The grain diameter of the salts is suitably within the range of less than 0.1 mm, that is the salts are in finely-powdered form.

Examples of suitable cyanuric acid derivatives are: cyanuric acid, cyanmide, dicyanamide, dicyandiamide, guanadine, biguanide, urazole, urazole cyanurate, polymers of melamine, melamine cyranurate, melamine, cyanuric acid esters and amides, particularly melamine which is preferred on account of its good availability.

Urea and the homologs or polymers thereof, hydrozodicarbonamide, allophante, biuret, the polycondensation products thereof and particularly the water-insoluble, optionally basically-modified condensation products thereof and formaldehyde-condensation products of these N-containing compounds can also be used.

The invention also incorporates the combination of red phosphorus, for example, in a quantity corresponding stoichiometrically to the phosphoric acids and, for example, melamine, since melamine converts immediately into phosphoric acids on combustion and then forms the phosphates of the melamine in situ.

Mixtures of various salts of cyanuric acid derivatives can also be used.

Examples of suitable rubbers are: natural rubber, polyisoprene, polybutadiene, ethylene-vinyl acetate-copolymers polymers and polymers containing diverse comonomers incoporated therein, of isoprene, butene, butadiene, pentene, propylene, ethylene, acrylonitrile, styrene, vinyl chloride, vinyl acetate, ethyl acrylate and butyl acrylate etc. Halogen-containing rubbers, such as fluro-elastomers, chlorosulphonated olefin polymers, in particular the commerically widely-used polychloroprene or halogen-free rubber of the olefin- or ethylene copolymer type, such as ethylene vinyl acetate, ethylene-propylenestyrene copolymers or block copolymers are of particular commercial interest.

These rubbers are formulated according to inventional techniques with a plurality of fillers, pigments, processing, plasticising, flame-proofing and vulcanising auxiliaries to produce a rubber mixture and are then shaped and vulcanised. The production and composition of such rubber mixtures, in particular also of polychloroprene are known.

The vulcanisation temperature should not exceed 250° C. and is preferably in the range of from 80° C. to 200° C.

The rubber mixtures or vulcanisates according to the invention are used wherever difficultly-flammable elastic materials with good mechanical properties are required.

As the mixtures or vulcanisates according to the invention undergo volume expansion on combustion, they are particularly suitable in massive, porous or foamed form, for sealing cable partitions in the form of sealing blocks or pre-shaped packings. However, cable sheaths joint profiles, seals, tube monocoques, coated worked fabric, woven fabric, non-woven fabric or yarns and fibres, coated rigid or flexible plates or even films, all of which contribute to fire protection, can also produced from the material according to the invention. Sealing profiles of such a material which may be designed in the form of hollow or massive profiles are of particular interest. It is also possible to use films of the material according to the invention or metallic or textile substrates which have been coated on one or both sides with the material according to the invention as films, aprons or curtains contributing to fire protection or to produce bindings therewith, with which the objects to be protected may be wound or lined.

Composite materials with metallic, mineral or organic reinforcing or supporting elements can also be used.

The rubber mixtures according to the invention in the form of plates, films, profiles, bands and granulated material can undergo further processing and shaping processes prior to or subsequent to vulcanisation. Extrusion or injection moulding processes can also be applied, in addition to pressing, stamping or doctoring processes.

In the following Examples, a chloroprene rubber mixture (c.f.G.Matenar and E.Rohde, Kautschuk and Gummi Kunststoffe, Vol 5, 30, page 289 (1977), vol 6, 30, page 363 (1977), is used as the base (I) which contains aluminum -hydroxide and polychloroprene rubber in a weight ratio of 1:1:25% by weight (2) or 50% by weight (3) of the aluminium-hydroxide are then replaced by a melamine phosphate which has been ground to a grain diameter of less than 0.1 mm and is produced form 1 mol melamine and 0.75 mol $H_3PO_4$.

Vulcanisates are produced form the mixture by 10 minute-long pressing at 150° C., which are in the form of plates 150×150×5 mm, as a standard ring I and in the form of right parellel piped cuboids 4×8×12 cm.

The following values are measured:

| Example | 1 | 2 | 3 |
|---|---|---|---|
| Density (g/cm$^3$) | 1.84 | 1.64 | 1.61 |
| Money viscosity ML 1 + 4; 100° C. mixture | 67 | 62 | 67 |
| Strength (MPa) standard ring | 4.1 | 4.8 | 3.5 |
| Strength 100% expansion (MPa) | 3.5 | 3.2 | 3.2 |
| Shore A hardness | 86 | 86 | 85 |
| Rebound resilience (%) | 22 | 23 | 23 |
| 5 min burning of strip 2.5 × 2.5 × 25 mm LOI values | >50 | >50 | >50 |
| pH of the smoke gas on removal of the flame | 1 | — | 8 |
| Intumescence (% by volume) | 3 | 25 | 90–125 |

It is of particular importance in relation to the present invention that mouldings in the form of test strips 2.5×2/5×25 mm show intumescence, if they contain melamine phosphate, when burned with the non-luminous flame of a natural gas bunsen burner. This means that electric cables which are enclosed in a tight manner by fixing devices consisting of the vulcanisate according to the invention remain tightly enclosed even if the cable sheaths combust under the effects of fire, as the intumescing rubber mixture fills up the cavities which are formed.

There is not subsequent burning of the vulcanisates to be observed on removal of the flame of the burner. The escaping gases have a very acidic character with (1), and are slightly basic and slightly corrosive with the formulation according to the invention (3). The measurements are carried out on removal of the burner flame using a strip of moist pH paper.

EXAMPLE 4

Half of the aluminium hydroxide is replaced by the melamine phosphate used in Example 2 in a peroxydically-cross-linkable rubber mixture based on ethylene-vinyl acetate-copolymer (45% vinyl acetate) which is flame-proofed with 50% by weight, based on copolymer, of aluminium hydroxide. Vulcanisation is carried out on the 3 mm thick test plates in the press for 15 min at 150° C.

Test strips 3×3×25 mm in dimension are cut from the comparative plate containing only aluminium-hydroxide and are tested for intumescence by burning, as in the previous Examples. While no signs of intumescence are observed on the samples containing only aluminium-hydroxide, the sample containing melamine phosphate increases its volume by about 200%. A fire-resistant carbonising foam is thereby formed.

We claim:

1. Rubber mixtures containing a flame-retarding and intumescence-providing filler, wherein the rubber is an ethylene-copolymer and the flame-retarding and intumescence-providing filler consists essentially of melamine phosphate and aluminum hydroxide.

2. Mouldings, obtained by vulcanising the rubber mixtures according to claim 1.

3. Rubber mixtures according to claim 1 which contain from 0.5 to 55% by weight, based on the total weight, of melamine phosphate.

* * * * *